(12) United States Patent
Hara (10) Patent No.: US 7,016,065 B2
(45) Date of Patent: Mar. 21, 2006

(54) IMAGE PROCESSING METHOD AND APPARATUS WITH MULTIPLE CODING UNITS

(75) Inventor: Katsuhiko Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 09/749,731

(22) Filed: Dec. 28, 2000

(65) Prior Publication Data

US 2001/0008002 A1    Jul. 12, 2001

(30) Foreign Application Priority Data

Jan. 6, 2000    (JP)    ............................. 2000-001018

(51) Int. Cl.
*G06F 13/00*    (2006.01)
*G06F 3/12*    (2006.01)

(52) U.S. Cl. .............................. 358/1.15; 358/426.03
(58) Field of Classification Search ........ 358/1.1–1.18, 358/426.01–426.08
See application file for complete search history.

(56) References Cited

U.S. PATENT DOCUMENTS 5,485,287 A    1/1996    Nakamura et al. .......... 358/426
5,490,237 A * 2/1996    Zimmerman et al. ....... 358/1.16
5,757,965 A * 5/1998    Ohki ........................... 382/232
5,999,654 A * 12/1999    Toujima et al. ............. 382/232

FOREIGN PATENT DOCUMENTS

| DE | 4302391 | 8/1993 |
| DE | 4408522 | 9/1994 |
| EP | 893766 | 1/1999 |
| EP | 0893766 A2 * | 1/1999 |
| GB | 2264022 | 8/1993 |
| JP | 61-164377 | 7/1986 |

* cited by examiner

*Primary Examiner*—Douglas Q. Tran
(74) *Attorney, Agent, or Firm*—Fitzpatrick, Cella, Harper & Scinto (57) ABSTRACT

The invention relates to an image processing apparatus which has a coding function of image data and inputs and outputs an image and a method for such an apparatus, and has an object to simultaneously perform coding of the image data in parallel in both a CPU and a coder/decoder. A system bus bridge (SBB) is a multichannel bidirectional bus bridge and provides a mutual connection between a B bus (I/O bus), a G bus (graphic bus), an SC bus (processor bus), and an MC bus (local bus) by using a crossbar switch. The connections of two systems can be simultaneously established by the crossbar switch. A high speed data transfer of high parallel performance can be realized among a CPU core, a CODEC, and a DRAM.

12 Claims, 6 Drawing Sheets

IMAGE PROCESSING METHOD AND APPARATUS WITH MULTIPLE CODING UNITS

BACKGROUND OF THE INVENTION

1. Field of the Invention

The invention relates to image processing apparatus and method. For example, the invention relates to image processing apparatus and method for efficiently controlling an image input apparatus such as a scanner or the like and an image output apparatus such as a printer or the like. More particularly, the invention relates to image processing apparatus which has a coding (compressing) function of image data and inputs and outputs an image and to a method for realizing such an apparatus.

2. Related Background Art

Hitherto, an image processing apparatus called hybrid equipment such as copying apparatus or facsimile constructed by an image input apparatus such as a scanner or the like and an image output apparatus such as a printer or the like or a computer system having a copying apparatus and a facsimile as sole apparatuses has been put into practical use. In such an apparatus, it is necessary to efficiently process a very large amount of data in order to handle image data.

For this purpose, there is also an image processing apparatus for coding input image data by both software which is executed by using a CPU and coding/decoding (compressing/decompressing) hardware (CODEC: Coder-Decoder). In such conventional image processing apparatuses, however, since an image data storing area, the CODEC, and the CPU are connected to the same bus, a transfer ability of the bus becomes a bottleneck upon coding (compression) of the image data.

To solve the above problem, there is also a system such that a transfer ability is enhanced by using two buses. Even in the system having a plurality of buses, however, a construction of the bus is not flexible and in the case where a large amount of data is transferred or the like, the transfer ability is not sufficiently utilized.

SUMMARY OF THE INVENTION

The invention is made to solve the above problems and it is an object of the invention to provide image processing apparatus and method, in which by using switching control means which can flexibly change a construction of a bus, image data can be simultaneously coded (compressed) by both a CPU and a CODEC.

To accomplish the above object, according to the present invention, there is provided an image processing apparatus comprising: a first bus which is connected to coding/decoding means of image data; a second bus which is connected to an image memory and used for transferring the image data; a third bus connected to a CPU for executing a coding process of the image data in accordance with a predetermined program; and switching control means for arbitrating connecting requests from the CPU and the coding/decoding means to the image memory and switching the connections of the buses, thereby enabling the image data to be coded by using the first bus during transfer of the image data using the second bus in accordance with a control by the CPU through the third bus.

The above and other objects and features of the present invention will become apparent from the following detailed description and the appended claims with reference to the accompanying drawings.

DETAILED DESCRIPTION OF THE PREFERRED EMBODIMENT

An embodiment according to the invention will now be described in detail hereinbelow with reference to the drawings.

Figure 1:
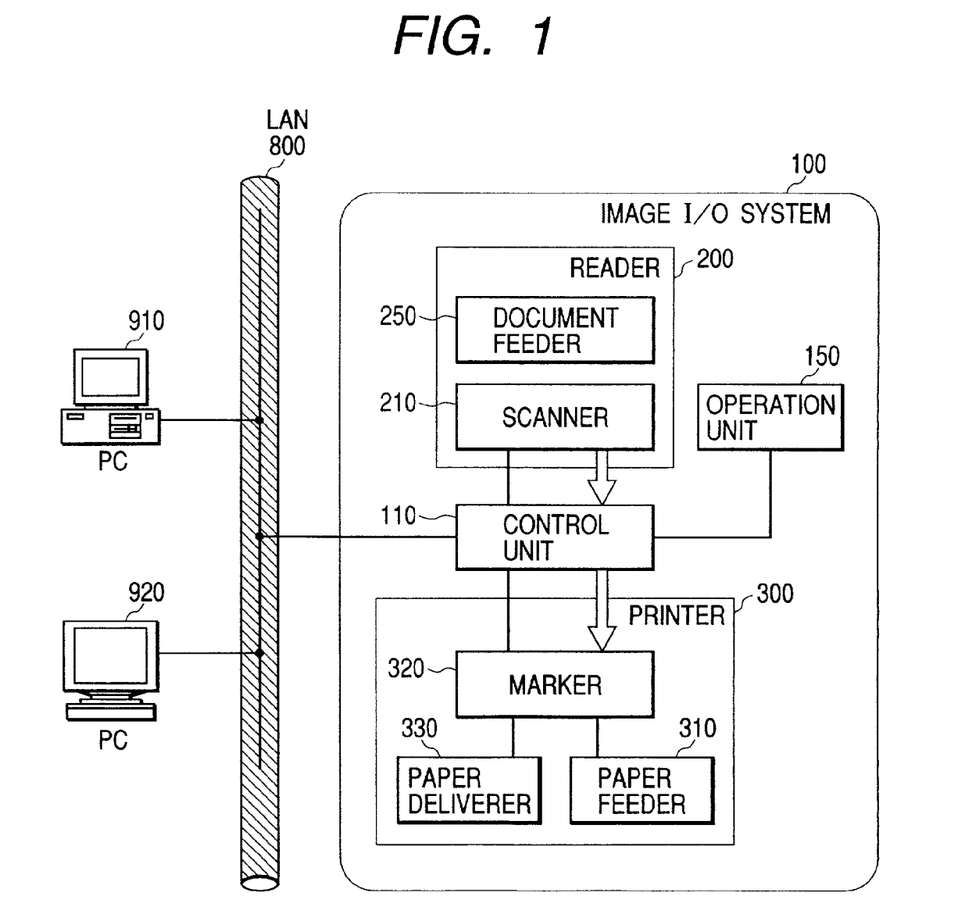
FIG. 1 is a block diagram showing a whole construction of an image processing apparatus according to an embodiment of the invention.

FIG. 1 is a block diagram showing a whole construction of an embodiment of an image processing apparatus (image input/output (I/O) system having an image input apparatus and an image output apparatus) according to the invention.

In an image I/O system 100 in FIG. 1, a reader (image input apparatus) 200 optically reads an image of an original and converts into image data. The reader 200 comprises: a scanner 210 having a function for reading the original; and a document feeder 250 having a function for feeding an original paper.

A printer (image output apparatus) 300 conveys a recording paper, prints a visible image according to the image data onto the recording paper, and delivers the paper to the outside of the apparatus. The printer 300 comprises: a paper feeder 310 having a plurality of kinds of recording paper cassettes (not shown); a marker 320 having a function for transferring the image according to the image data onto the recording paper and fixing it; and a paper deliverer 330 having a function for sorting and stapling the recording papers on which the images have been fixed and outputting them to the outside of the apparatus.

A control unit 110 is electrically connected to the reader 200 and printer 300 and further connected to host computers (PCs) 910 and 920 through a network 800 such as LAN (Local Area Network) or the like.

The control unit 110 controls the reader 200, reads the image data of the original, controls the printer 300, outputs the image data onto the recording paper, and provides a copying function. The control unit 110 also provides: a scanner function for converting the image data read out by the scanner 210 into code data and transmitting the code data to the host computers 910 and 920 through the network 800; and a printer function for converting the code data received from the host computers 910 and 920 through the network 800 into image data and allowing the printer 300 to output the image.

An operation unit 150 connected to the control unit 110 is constructed by a liquid crystal touch panel and provides a user I/F (interface) for operating the image I/O system.

Figure 2:
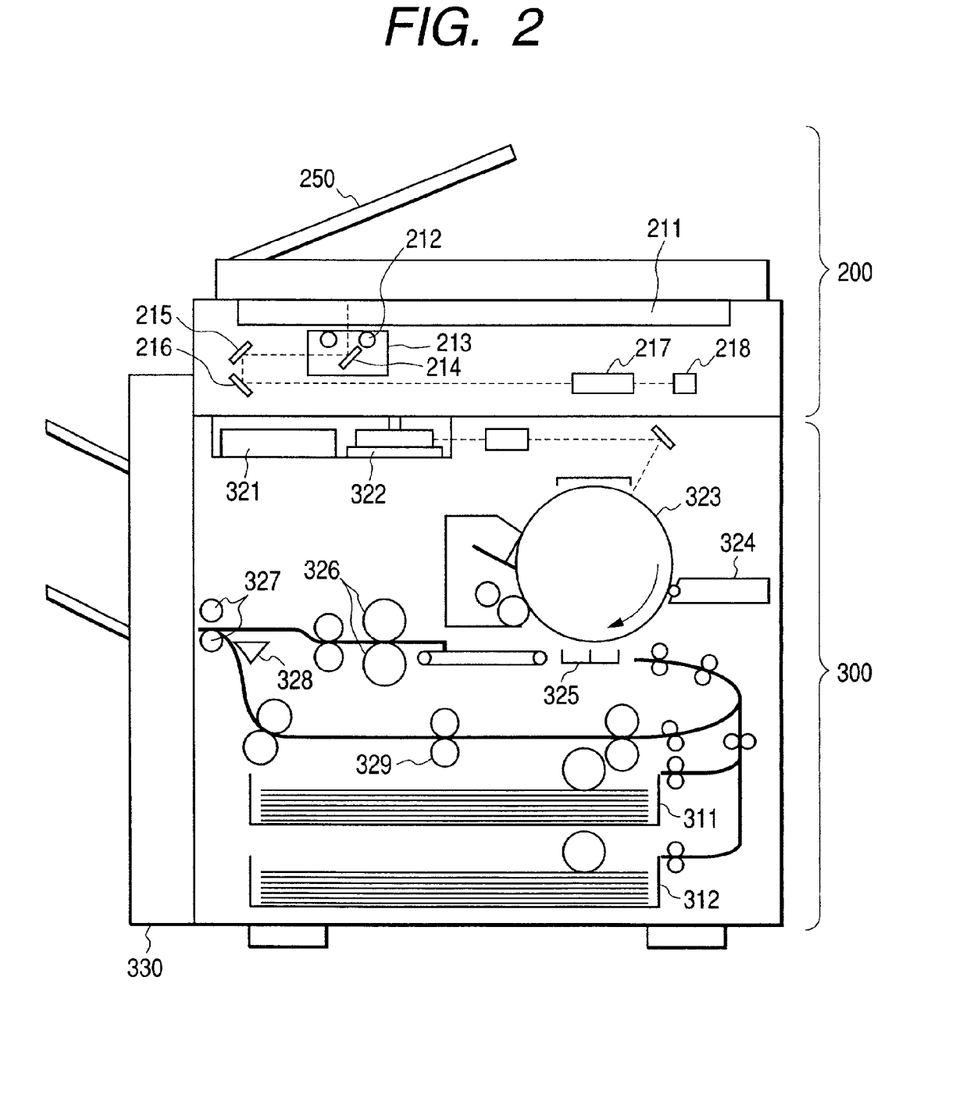
FIG. 2 is a cross sectional view of the image processing apparatus according to the embodiment.

FIG. 2 is a cross sectional view of an image processing apparatus according to the embodiment having the reader 200 and printer 300.

The document feeder 250 of the reader 200 sequentially feeds the originals one by one from the head onto a platen glass 211. After completion of the reading operation of the original, the document feeder 250 delivers the originals on the platen glass 211. When the original is conveyed onto the platen glass 211, a lamp 212 is lit on, the movement of an optical unit 213 is started, and the original is exposure scanned. Reflection light from the original in this instance is led to a CCD image sensor (hereinafter, referred to as CCD) 218 by mirrors 214, 215, and 216 and a lens 217.

The image of the original scanned as mentioned above is read by the CCD 218. The image data outputted from the CCD 218 is subjected to predetermined processes and, thereafter, transferred to the control unit 110.

A laser driver 321 of the printer 300 drives a laser emitter 322 and allows the laser emitter 322 to emit a laser beam according to the image data outputted from the control unit 110. The laser beam is irradiated onto a photosensitive drum 323. A latent image according to the laser beam is formed on the photosensitive drum 323. A developing agent is adhered to the portion of the latent image on the photosensitive drum 323 by a developer 324.

The recording paper is fed out from one of cassettes 311 and 312 at a timing synchronized with the start of the irradiation of the laser beam and conveyed to a transfer unit 325 and the developing agent adhered onto the photosensitive drum 323 is transferred to the recording paper. The recording paper on which the developing agent has been adhered is conveyed to a fixing unit 326. The developing agent is fixed onto the recording paper by heat and pressure of the fixing unit 326. The recording paper which passed through the fixing unit 326 is delivered by delivery rollers 327. The paper deliverer 330 binds the delivered recording papers, sorts them, and staples the sorted recording papers.

When a both-side recording mode has been set, after the recording paper is conveyed to the delivery rollers 327, the rotating direction of the delivery rollers 327 is reversed and the paper is led to a refeed conveying path 329 by a flapper 328. The recording paper led to the refeed conveying path 329 is fed to the transfer unit 325 at the foregoing timing.

<Control Unit>

Figure 3:
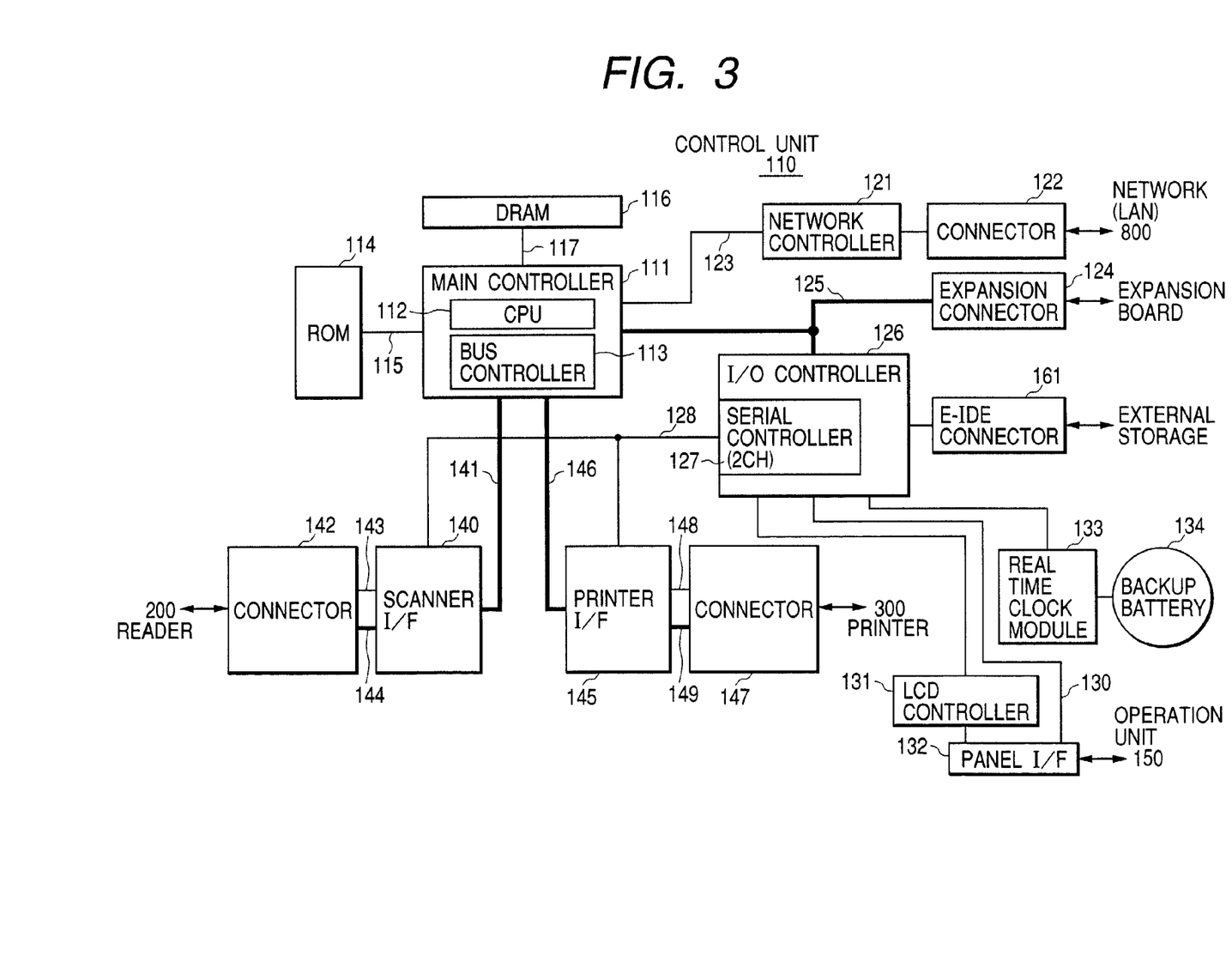
FIG. 3 is a functional block diagram of a control unit for use in the image processing apparatus according to the embodiment.

Functions of the control unit 110 will now be described with reference to a block diagram shown in FIG. 3.

A main controller 111 mainly comprises: a CPU 112; a bus controller 113; various I/F controller circuits (not shown but will be explained hereinlater); a coder-decoder (CODEC) (not shown but will be explained hereinlater); and the like.

The CPU 112 and bus controller 113 control the whole operation of the control unit 110. The CPU 112 operates on the basis of a program read out from an ROM 114 via an ROM I/F 115. The CPU 112 interprets PDL (page description language) code data received from the host computers 910 and 920. The operation for developing the image data into raster image data has been described in the PDL program. The CPU 112 executes an image data developing process by software. The bus controller 113 controls a transfer of data which is inputted and outputted to/from each I/F and performs an arbitration upon competition of the buses and a control of the DMA data transfer.

A DRAM 116 comprising a synchronous DRAM is connected to the main controller 111 by a DRAM I/F 117 and used as a work area for allowing the CPU 112 to operate and an image accumulating area for accumulating the image data.

A network controller 121 is connected to the main controller 111 by an I/F 123 and connected to an external network by a connector 122. The Ethernet can be generally used as a network.

An expansion connector 124 for connecting an expansion board and an I/O controller 126 are connected to a general high speed bus 125. Generally, a PCI bus can be mentioned as a general high speed bus 125.

A serial controller 127 of two channels is equipped for the I/O controller 126. The serial controller is connected to external I/F circuits 140 and 145 by an I/O bus 128, thereby enabling control commands to be transmitted and received to/from CPUs of the reader 200 and printer 300.

A panel I/F 132 is connected to an LCD controller 131 and constructed by: an I/F for displaying on a liquid crystal display unit on the operation unit 150; and a key input I/F 130 for inputting by hard keys or touch panel keys.

The operation unit 150 comprises: the liquid crystal display unit (not shown); a touch panel input apparatus (not shown) adhered onto the liquid crystal display unit; and a plurality of hard keys or a keyboard (not shown). A signal inputted from the touch panel input apparatus or hard keys is sent to the CPU 112 through the panel I/F 132 mentioned above, thereby allowing the image data sent from the panel I/F 132 to be displayed on the liquid crystal display unit. Functions in the operation of the image forming apparatus, the image data, and the like are displayed on the liquid crystal display unit.

A real time clock module 133 is used for updating and storing a date and a time which are managed in the equipment and backed up by a backup battery 134.

An E-IDE interface 161 is used for connecting an external storing device. A hard disk drive or a CD-ROM drive is connected through the E-IDE interface 161 and a program and image data can be written or read out.

A connector 142 is connected to the reader 200 and constructed by a serial I/F 143 and a video I/F 144. A connector 147 is connected to the printer 300 and constructed by a serial I/F 148 and a video I/F 149.

The scanner I/F 140 is connected to the reader 200 through the connector 142 and connected to the main controller 111 by a scanner bus 141. The scanner I/F 140 has a function for performing an optimum binarization and a zooming process in the main scanning and sub-scanning directions to the image received from the reader 200 in accordance with processing contents in the subsequent steps. The scanner I/F 140 further has a function for outputting a control signal formed on the basis of a video control signal sent from the reader 200 to the scanner bus (video I/F (reader)) 141.

The data transfer from the scanner bus 141 to the DRAM 116 is controlled by the bus controller 113.

The printer I/F 145 is connected to the printer 300 through the connector 147 and connected to the main controller 111 by a printer bus (video I/F (printer)) 146. The printer I/F 145 has a function for performing a smoothing process to the image data outputted from the main controller 111 and outputting the processed data to the printer 300. Further, the printer I/F 145 also has a function for outputting a control signal formed on the basis of a video control signal sent from the printer 300 to the printer bus 146.

The raster image data developed in the DRAM 116 through the scanner bus 141 in accordance with the image read by the scanner 210 is controlled by the bus controller 113 and transferred to the printer 300. That is, the raster image data is DMA transferred to the printer 300 via the printer bus 146, printer I/F 145, and video I/F 149.

<Main Controller>

Figure 4:
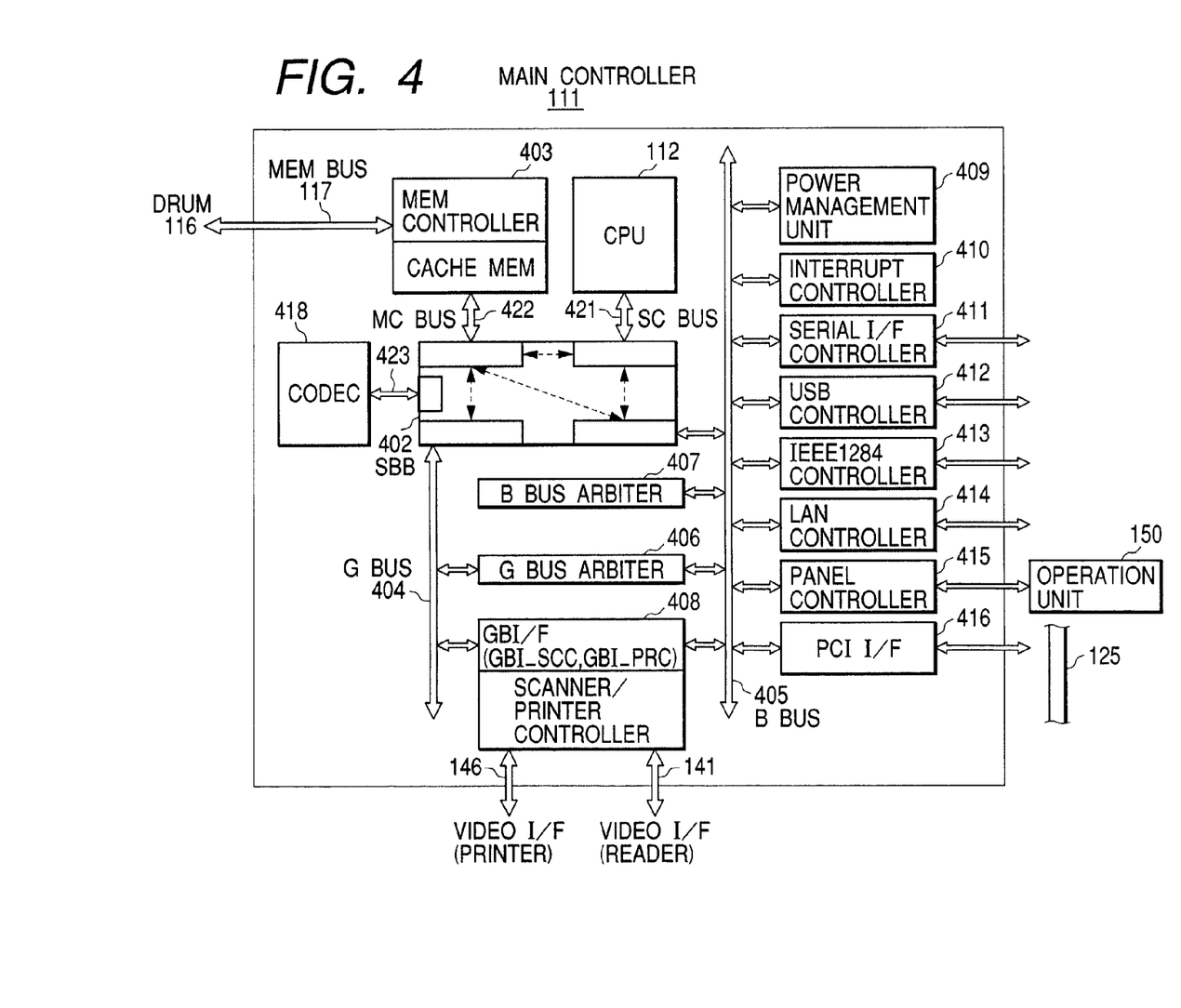
FIG. 4 is a block diagram of a main controller for use in the image processing apparatus according to the embodiment.

FIG. 4 is a block diagram showing an internal construction of the main controller 111.

The CPU core (CPU) 112 is connected to a system bus bridge (SBB) 402 through a processor bus (SC bus) 421 of 64 bits. The system bus bridge 402 is constructed by a 64-bit crossbar switch of (4×4) and connected to a local bus (MC bus) 422, a G bus 404 as a graphic bus, and a B bus 405 as an I/O bus besides the SC bus 421. The MC bus 422 is a dedicated bus with a memory (SDRAM & ROM) controller (MC) 403. The memory controller 403 has a cache memory and controls the DRAM 116 and ROM 114.

The system bus bridge (SBB) 402 is designed so that the simultaneous parallel connection among the four modules can be assured as much as possible. If a connecting request corresponding to the channels over the number of channels which can be connected in parallel is issued from each module connected to the SBB 402, an arbitration control is executed on the basis of a predetermined priority order. The system bus bridge (SBB) 402 is also connected to a coder-decoder (CODEC) 418 of the data through a CODEC bus 423.

The G bus 404 is cooperatively controlled by a G bus arbiter (GBA) 406 and connected to a scanner/printer controller (SPC) 408 for connecting to the reader 200 and printer 300. The B bus 405 is cooperatively controlled by a B bus arbiter (BBA) 407. The B bus 405 is connected to not only the SPC 408 but also a power management unit (PMU) 409, an interrupt controller (IC) 410, and the foregoing various (I/F)s controllers, respectively.

That is, the B bus 405 is also connected to a serial I/F controller (UARTSIC) 411 using a UART, a USB controller (USBC) 412, a parallel I/F controller (IEEE1284 (PIC), i.e., IEEE1284 controller) 413, an LAN controller (LANC) 414 using the Ethernet, an LCD panel, keys, a general I/O controller (panel controller) 415, and a PCI I/F (PCIC) 416, respectively.

The operation unit 150 having the foregoing liquid crystal display unit, keyboard, and the like is connected to the PC 415.

<Interrupt Controller>

The interrupt controller 410 is connected to the B bus 405, collects interrupts from each functional block in a main controller chip and from the outside of the chip, and distributes them again to a 6-level external interrupt which is supported by the CPU core 112 and a non-maskable interrupt (NMI). The functional blocks include the PMU 409, UARTSIC 411, USBC 412, IEEE1284 controller (PIC) 413, LANC 414, panel controller 415, a PCI bus interface (PCIC) 416, scanner/printer controller 408, and the like.

<Memory Controller>

The memory controller 403 is connected to the MC bus 422 as a dedicated local bus for the memory controller and controls the synchronous DRAM (DRAMA 116), the ROM 114, and a flash ROM.

<System Bus Bridge>

The system bus bridge (SBB) 402 is a multichannel bidirectional bus bridge and provides a mutual connection between the B bus (I/O bus) 405, G bus (graphic bus) 404, SC bus (processor bus) 421, and MC bus (local bus) 422 by using a crossbar switch. The connections of two systems can be simultaneously established by the crossbar switch. A data decoding processing time can be reduced by performing a high speed data transfer with high parallel performance using software and hardware.

Figure 5:
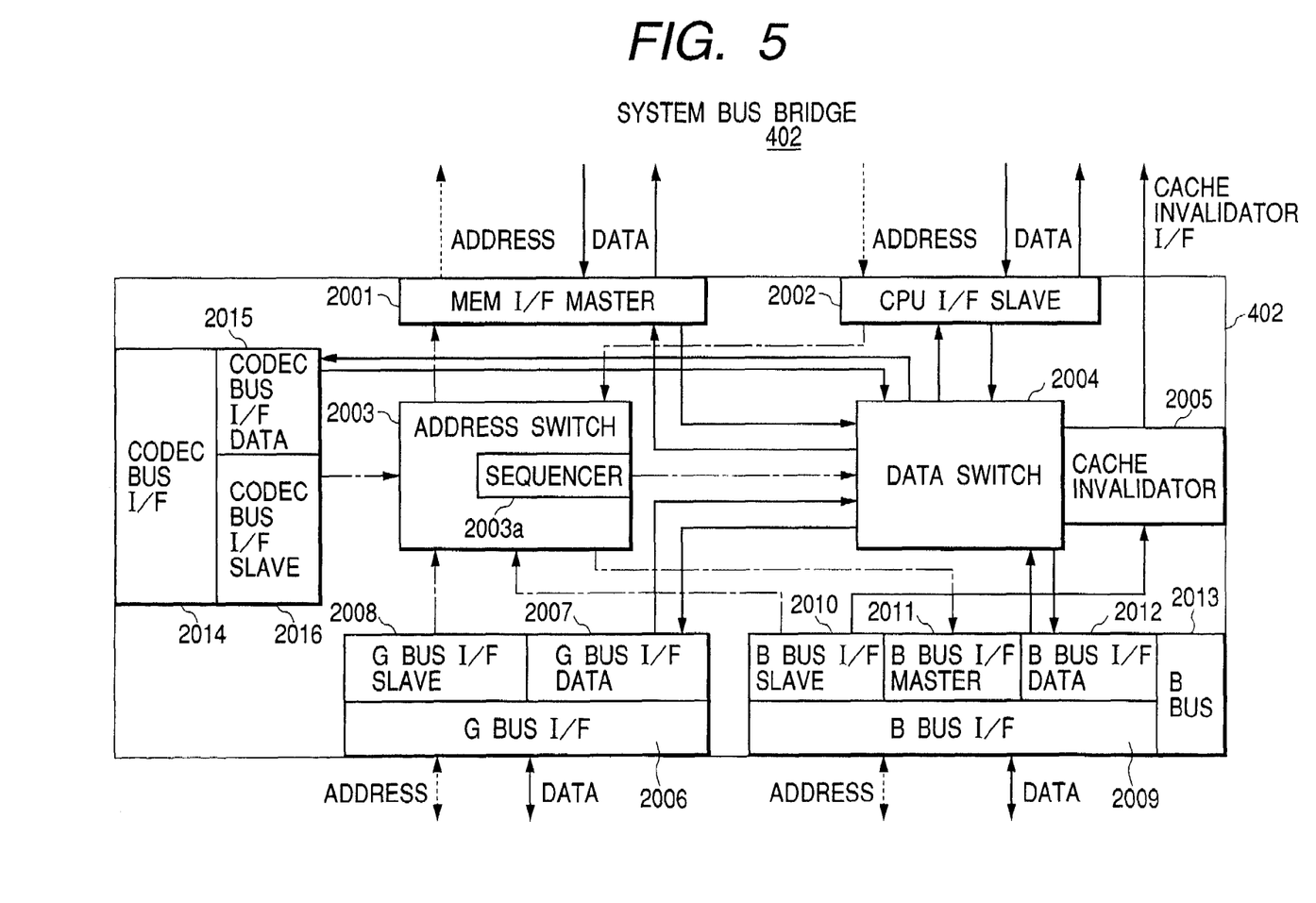
FIG. 5 is a block diagram of a system bus bridge for use in the image processing apparatus according to the embodiment.

FIG. 5 is a constructional diagram showing the system bus bridge (SBB) in detail.

The system bus bridge (SBB) 402 has: a B bus I/F 2009 for connecting to the B bus 405; a G bus I/F 2006 for connecting to the G bus 404; a CPU I/F slave port 2002 for connecting to the CPU core 112; a memory I/F master board 2001 for connecting to the memory controller 403; and a CODEC bus I/F 2014 for connecting to the CODEC 418. The system bus bridge (SBB) 402 also has: an address switch 2003 for connecting an address bus; a data switch 2004 for connecting a data bus; and a cache invalidator 2005 for invalidating a cache memory in the CPU core 112.

<PCI Bus Interface>

Returning to FIG. 4, the PCI I/F 416 is a block for interfacing the B bus 405 as a general I/O bus in the main controller 111 and the PCI bus 125 as an I/O bus outside of the chip.

<G Bus Arbiter, B Bus Arbiter>

Arbitration of the G bus arbiter 406 is based on a center arbitration system and the arbiter 406 has a dedicated request signal and a ground signal for each bus master. The G bus arbiter 406 can program a control method. Two modes can be selectively designated as a method of giving priority to the bus masters. One of the modes is an equitable arbitration mode in which the same priority is given to all of the bus masters and a bus right is fairly given. The other is a priority arbitration mode in which priority of one of the bus masters is set to be high, thereby enabling such a bus master to preferentially use the bus.

The B bus arbiter 407 accepts a bus using request of the B bus 405 as a general I/O bus. After completion of the arbitration, the B bus arbiter 407 gives a bus using permission to the one selected bus master, thereby inhibiting simultaneous bus accesses by two or more bus masters. The arbitration system of the B bus arbiter 407 provides priority of three stages and a plurality of bus masters are programmably allocated to each priority.

<Scanner/Printer Controller>

Figure 6:
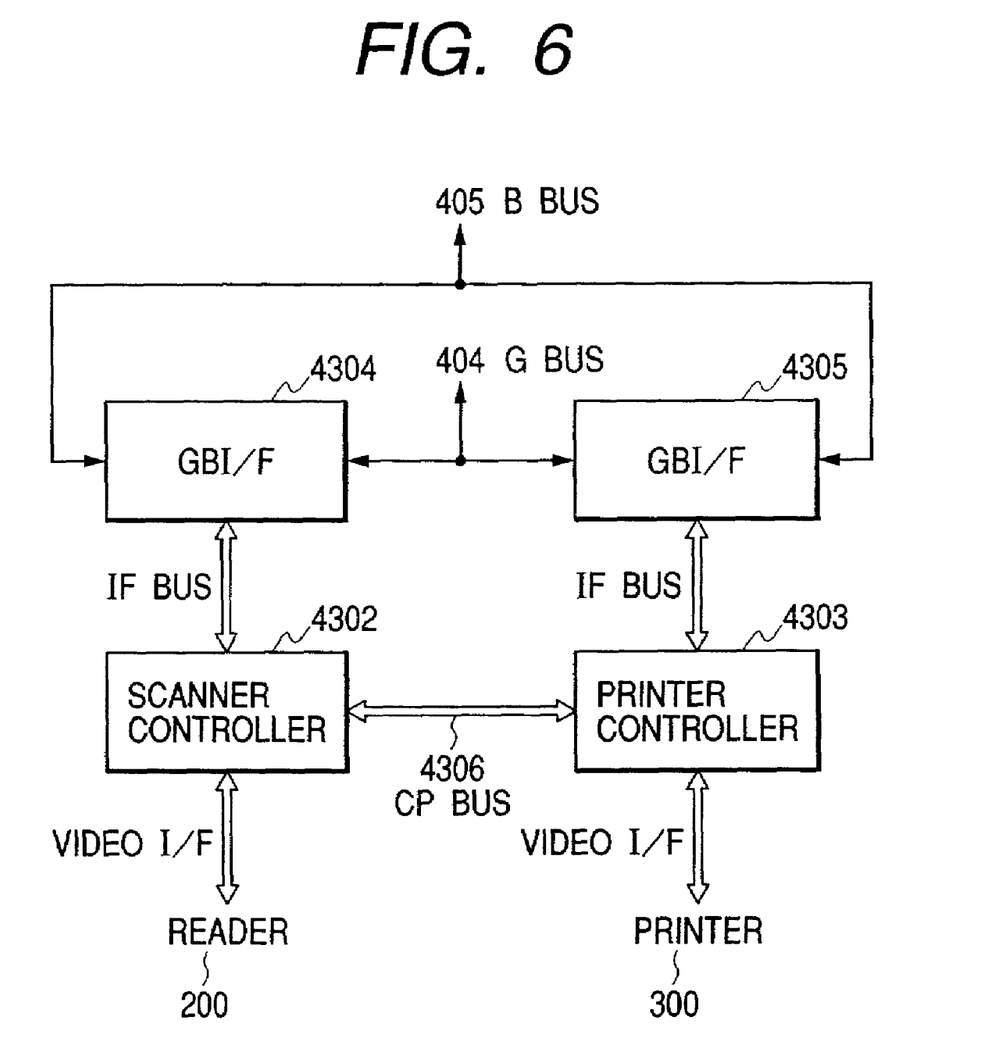
FIG. 6 is a block diagram of a scanner/printer for use in the image processing apparatus according to the embodiment.

The scanner/printer controller 408 connected to the reader 200 and printer 300 by the video I/F 141 and 146 makes an interface between the G bus 404 and B bus 405 in the controller. As shown in FIG. 6, the scanner/printer controller 408 is mainly constructed by: three blocks, that is, a scanner controller (SCC) 4302, a printer controller (PRC) 4303, and a G bus/B bus I/F units (GB I/F) 4304 and 4305; and a CP bus 4306.

The scanner controller (SCC) 4302 is connected to the reader 200 by the video I/F and controls the operation and data transfer. The scanner controller 4302 is connected to the G bus/B bus I/F unit (GB I/F) 4304 by the I/F bus and performs the data transfer and the reading/writing operations of a register.

The printer controller (PRC) 4303 is connected to the printer 300 by the video I/F and controls the operation and data transfer. The printer controller 4303 is connected to the G bus/B bus I/F unit (GB I/F) 4305 by the I/F bus and performs the data transfer and the reading/writing operations of a register.

The G bus/B bus I/F units (GB I/F) 4304 and 4305 are units for connecting the scanner controller 4302 and printer controller 4303 to the G bus 404 or B bus 405. Both units are independently connected to the scanner controller 4302 and printer controller 4303, respectively, and connected to both G bus 404 and B bus 405.

The CP bus 4306 is a bus for directly connecting the image data of the reader 200 and printer 300 and sync signals for horizontal and vertical synchronization.

<Power Management of Main Controller>

Returning to FIG. 4, the main controller 111 is constructed by a large scale ASIC having a CPU therein. Therefore, if all internal logics simultaneously operate, the main controller 111 generates a large amount of heat and there is a fear that the chip itself is broken. To prevent it, the main controller 111 performs a power management of every block and, further, monitors an amount of electric power consumption of the whole chip.

The power management is individually performed in each block. Information of the amount of electric power consumption of each block is collected as a power management level to the power management unit 409. The power management unit 409 sums the amount of electric power consumption of each block and monitors the amount of electric power consumption of each block in the main controller 111 in a lump, thereby preventing the total electric power amount from exceeding a limit electric power consumption.

Subsequently, the copying operation by the image I/O system 100 according to the embodiment with the above construction will be described.

In the reader 200, when the scanner 210 starts to read the image, the scanner 210 generates a vertical sync signal (VSYNC), horizontal sync signal (HSYNC), and a video clock to the scanner controller (SCC) 4302. The image data is outputted from the scanner 210 synchronously with those timing signals. The scanner controller 4302 fetches the image data synchronously with each of the timing signals. The fetched image data passes through the G bus 404 and MC bus 422 and is DMA transferred to the memory controller 403 by GBI_SCC of the GB I/F 4304. The memory controller 403 writes the DMA transferred image data into the DRAM 116 through the memory bus 117.

The image data written in the DRAM 116 is coded by the CODEC 418 and, thereafter, passes through the CODEC bus 423 and memory bus 117 and written into the DRAM 116 again. To the CODEC 418, the CPU core 112 instructs an amount of transfer image to be coded which has previously been calculated from the image data amount.

The previously instructed image data in the image data written in the DRAM 116 is coded by the CODEC 418. The remaining image data is coded by the CPU core 112 and, thereafter, written in the DRAM 116 again.

Although the image data coding by the CODEC 418 and the image data coding by the CPU core 112 can be executed in parallel, at this time, a deterioration of the bus transfer ability due to the bus switching is not caused owing to the operation of the system bus bridge 402.

When an amount of coded image data written in the DRAM 116 reaches an amount by which a difference of the image data transfer speeds of the scanner 210 and printer 300 can be buffered, the image data transfer from the DRAM 116 to the printer 300 via the memory bus 117, MC bus 422, and G bus 404 is started. The amount of coded image data can be discriminated by various methods such as discrimination by the data transfer time from the scanner 210, discrimination by an address which is written in the DRAM 116, discrimination of the DMA transfer amount in the GBI_SCC, and the like.

The image data transfer to the printer 300 is performed under control of the printer controller (PRC) 4303.

The printer controller 4303 decodes the coded image data written in the DRAM 116 by the DMA transfer of GBI_PRC of the GB I/F 4305 by a well-known decoding system and, thereafter, sequentially stores it into an internal FIFO (not shown). The decoding system can be realized by any of the CODEC 418 as hardware, software which is executed by the CPU core 112, or parallel processes of both of them.

The printer controller 4303 simultaneously generates the vertical sync signal (VSYNC) to the printer 300. After that, the horizontal sync signal (HSYNC) and video clock are inputted from the printer 300 to the printer controller 4303. The printer controller 4303 outputs the image data stored in the internal FIFO to the printer 300 synchronously with the inputted HSYNC and video clock. In accordance with a flow of the image data as mentioned above, the copying operation for outputting the image corresponding to the image data obtained by the reading by the scanner 210 from the printer 300 is executed.

A flow of the image data in the copying operation according to the embodiment is as follows. The reader 200→the scanner controller (SCC) 4302→the GB I/F 4304 (GBI_SCC) of the reader 200→the memory controller (MC) 403→the DRAM 116→the CODEC 418 (CPU core 112 in the case where the copying operation is performed by software)→the DRAM 116→the memory controller (MC) 403→the GB I/F 4305 (GBI_PRC) of the printer→the printer controller (PRC)→the printer 300.

According to the image processing apparatus and method of the invention as described above, by arbitrating the first connecting request to the image memory from the coding/decoding means of the image data and the second connecting request to the image memory from the CPU for executing the coding process of the image data in accordance with a predetermined program and switching the connection of the buses, the image data coding operations are simultaneously executed in parallel in both of the CPU and the coding/decoding means, so that the image data can be coded at a high speed. That is, there is an effect such that the coding time of the image data can be reduced.

What is claimed is:

1. An image processing apparatus comprising:
    an image memory unit adapted to store image data;
    first and second coding units capable of at least encoding image data stored in said image memory; and
    first and second buses connected respectively to said first and second coding units and to a switching control unit which is connected by a third bus to an image memory unit adapted to store image data,
    wherein said switching control unit is adapted to control access from said first and second coding units to said image memory unit by providing a first data transfer channel between said first bus and said third bus and a second data transfer channel between said second bus and said third bus simultaneously so that image data coding of a first portion of the image data, executed by said first coding unit, and image data coding of a second portion of the image data, executed by said second coding unit, can be executed in parallel.

2. An apparatus according to claim 1, wherein at least one of said first coding unit and said second coding unit are also capable of decoding image data.

3. An apparatus according to claim 1, wherein said switching control unit further comprises:
    a memory control unit, connected to said third bus, adapted to control said image memory unit; and a bus control unit connected to said first and second buses and further connected to said memory control unit through a fourth bus.

4. An apparatus according to claim 3, further comprising:
an image interface unit adapted to connect the image processing apparatus to an image input apparatus or an image output apparatus and transmit the image data to said image output apparatus or receive the image data from said image input apparatus; and
a transfer control unit adapted to control the image data transfer between said image memory unit and said apparatus connected to said image interface unit through said switching control unit.

5. An apparatus according to claim 4, wherein said switching control unit further has a cache memory.

6. An apparatus according to claim 4, wherein said transfer control unit is adapted to discriminate the amount of image data stored in said image memory unit so that in a case where said image data amount reaches an amount by which a connected image output apparatus can output an image at a predetermined speed irrespective of the difference of processing speeds between said image input apparatus and said image output apparatus, and said image processing apparatus transfers image data from said image memory unit to said connected image output apparatus through said switching control unit.

7. An apparatus according to claim 1, wherein said switching control unit comprises a crossbar switch.

8. A method of executing image processing on an image processing apparatus having first and second coding units capable of encoding image data connected to first and second buses connected to a switching control unit connected by a third bus to an image memory unit adapted to store image data, said method comprising:
an access control step of controlling access from said first and second coding units to said image memory unit by providing a first data transfer channel between said first bus and said third bus and a second data transfer channel between said second bus and said third bus simultaneously; and
an executing step of executing image data coding of a first portion of the image data, executed by said first coding unit, and image data coding of a second portion of the image data, executed by said second coding unit, in parallel, wherein the first portion of the image data is transferred from the image memory unit by using the first data transfer channel and the second portion of the image data is transferred from the image memory unit by using the second data transfer channel.

9. A method according to claim 8, wherein at least one of said first coding unit and said second coding unit are also capable of decoding image data.

10. A method according to claim 9, further comprising:
a connecting step of connecting the image processing apparatus to an image input apparatus;
a receiving step of receiving the image data from said image input apparatus; and
a transfer control step of controlling the image data transfer between said image memory unit and said image input apparatus connected to the image processing apparatus in said connecting step.

11. A method according to claim 9, further comprising:
a connecting step of connecting the image processing apparatus to an image output apparatus;
a transmitting step of transmitting the image data to said image output apparatus; and
a transfer control step of controlling the image data transfer between said image memory unit and said image output apparatus connected to the image processing apparatus in said connecting step.

12. A method according to claim 10, further comprising the step of:
a discriminating step of discriminating the amount of image data stored in said image memory unit so that in a case where said image data amount reaches an amount by which a connected image output apparatus can output an image at a predetermined speed irrespective of the difference of processing speeds between said image input apparatus and said image output apparatus, the image data being transferred from said image memory unit to said connected image output apparatus through said switching control unit.

* * * * *